Patented July 17, 1923.

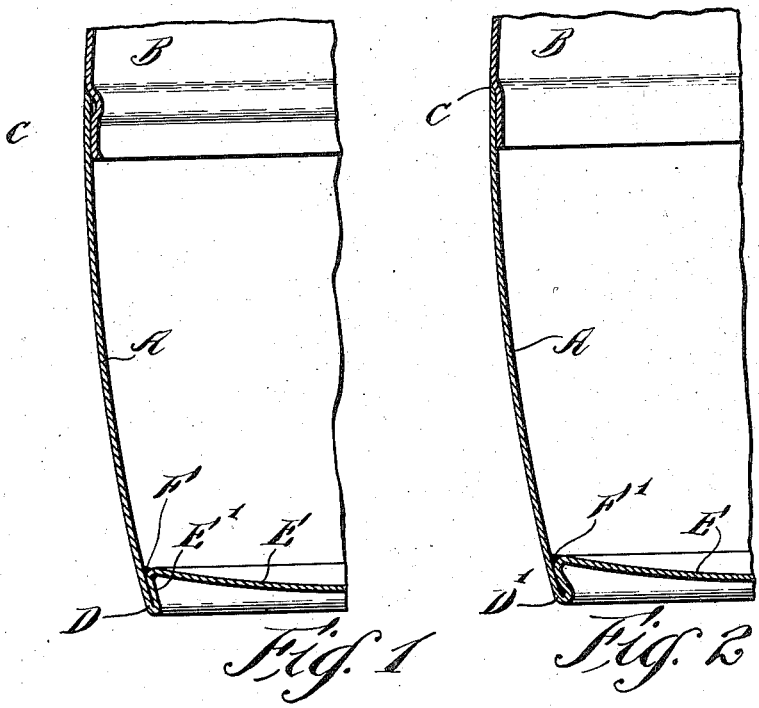
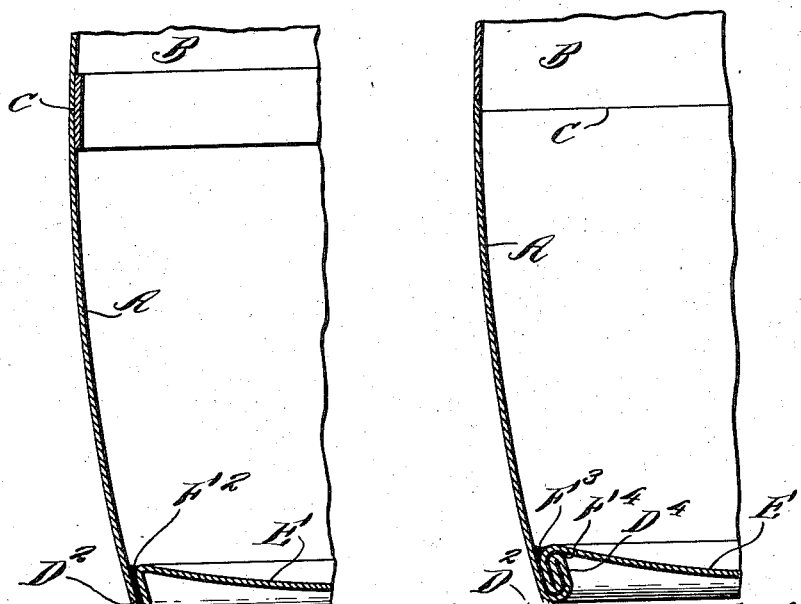

1,461,729

UNITED STATES PATENT OFFICE.

HENRY J. FOSTER AND OWEN THOMAS, OF CLEVELAND, OHIO, ASSIGNORS TO THE HYDRAULIC PRESSED STEEL COMPANY, OF CLEVELAND, OHIO, A CORPORATION OF OHIO.

METHOD OF FORMING SHEET-METAL BARREL CHIMES.

Application filed June 11, 1919. Serial No. 303,458.

*To all whom it may concern:*

Be it known that we, HENRY J. FOSTER and OWEN THOMAS, citizens of the United States, residing at Cleveland, in the county of Cuyahoga and State of Ohio, have invented a certain new and useful Improvement in Methods of Forming Sheet-Metal Barrel Chimes, of which the following is a full, clear, and exact description, reference be had to the accompanying drawings.

This invention relates generally to sheet metal barrels composed of two substantially similar sections joined together at the transverse center of the barrel, and, in particular this invention relates to the chime construction of a barrel constructed in this manner.

The object of the invention is to provide a novel method of forming the chime of a sheet metal barrel and the invention resides in the novel steps hereinafter fully described and pointed out in the claim.

In the drawings forming a part of this specification, Fig. 1 is a detail sectional view illustrating the chime constructed in accordance with our invention; Fig. 2 is a view showing a slight modification; Fig. 3 is a similar view showing the same general features of chime construction but showing the barrel sections united in a slightly different manner from the sections shown in Figs. 1 and 2; and Fig. 4 is a similar view showing a still further modification of the chime feature.

In Fig. 1, A indicates one-half of a sheet metal barrel and B the opposite half, these halves being united at C in the manner set forth in our application of even date herewith.

The chime D is formed by pressing the head E inwardly and bringing the edge E' of the head into close proximity with the side portion of the barrel section, and this edge E' is brazed to the side of the barrel section by the introduction of brazing metal F into the annular space intervening between the side of the barrel and the flanged edge E' of the head. By constructing the chime in this manner a very sharp thin chime can be provided which will have the strength of the combined sheets of metal from which it is produced, and by having the two portions of the chime united by brazing material all danger of separation, due to internal pressures, or external blows, will be avoided.

In Fig. 2 we have shown a very slight modification in which the chime D' is formed in substantially the same manner but it will be noted that it is rounded somewhat in the folding-back process so as to provide an annular recess or channel which is slightly larger at its outer end and the brazing material F' will not only fill this enlargement but will be made substantially flush with the head thereby eliminating the formation of a pocket.

In Fig. 3 the same general idea is shown, the chime $D^2$ in this instance being formed as before by folding back the edge portion of the head but the intervening annular space or recess will be somewhat wider and capable of receiving a larger quantity of brazing metal $F^2$ thus providing a broader and comparatively stronger chime than the structure shown in Fig. 1.

In Fig. 4 we have shown a chime which is constructed upon the same general plan but materially reenforced by folding or doubling the chime as previously described. In making the chime in this manner there is first produced a deep chime $D^2$ by pressing back the head E about twice the distance as heretofore thereby providing about twice the length of marginal edge or flange in substantially parallel relation with the side of the barrel, as most clearly shown in dotted lines in Fig. 4. The brazing material $F^3$ is then introduced into the annular space and the double chime with the braze filling is then folded back upon itself as shown at $D^4$ providing a chime composed of four thicknesses of metal and two thicknesses of interposed brazing metal and then the inwardly rolled or folded edge of the chime is connected to the inner portion thereof by the application of brazing metal $F^4$ thereby adding an additional layer of brazed metal to the structure and also closing the gap between the exterior of the head and the inner rolled end of the chime.

A chime constructed in accordance with this last modified method will be found to have great strength, imparting rigidity to the end of the barrel and capable of withstanding great internal pressures and exterior blows.

Having thus described our invention, what we claim is:

The herein described method of forming sheet metal barrel chimes which consists in folding back the head providing an integral chime composed of inner and outer members, connecting said members by brazing, then folding inwardly the outer end of the chimes so constructed, and finally brazing the folded end to the barrel head.

In testimony whereof, we hereunto affix our signatures.

HENRY J. FOSTER.
OWEN THOMAS.